United States Patent [19]

Piekutowski

[11] Patent Number: 5,142,963
[45] Date of Patent: Sep. 1, 1992

[54] LOAD REFERENCED PRESSURE REDUCING VALVE

[75] Inventor: Richard P. Piekutowski, Huber Heights, Ohio

[73] Assignee: Spectra-Physics Laserplane, Inc., Dayton, Ohio

[21] Appl. No.: 782,408

[22] Filed: Oct. 25, 1991

[51] Int. Cl.⁵ .................. F15B 13/02; F15B 13/08; F16K 31/122
[52] U.S. Cl. .......................... 91/31; 91/446; 91/449; 91/531; 137/312; 137/454.5; 137/501
[58] Field of Search .............. 91/31, 446, 449, 531; 137/312, 454.5, 501

[56] References Cited

U.S. PATENT DOCUMENTS 2,655,940 10/1953 Jackson .
4,422,470 12/1983 Jackson et al . ................. 137/501 X

OTHER PUBLICATIONS

Catalog sheets from Parker Fluidpower, including pp. 1, 8-9, PC-148 to 149 and PC-161 to 162, all relating to series PR pressure reducing valves (Undated).
Catalog sheets for Fluid Controls, Inc. pressure reducing valves, p. PC-14 (Undated).
Catalog sheets for Modular Controls compensator spool elemnt, drawing No. PCS 3-XXX-OX-XX (2 pages) (Undated).
Scott Equipment Company catalog sheets for proportional pressure control valves, VP Series 3 and 06, pp. 230-232 (Undated).
Continental Hydraulics catalog sheets for EP35 M electro-hydraulic proportional valves, (four sheets) Dec., 1979.
Sun catalog sheets for pressure reducing and reducing-/relieving valves, pp. 3.01, 2.10 and 3.11 (Undated).
Spectra-Physics catalog for LASERPLANE Motor-grader Control System, 1988.

Primary Examiner—Gerald A. Michalsky
Attorney, Agent, or Firm—Killworth, Gottman, Hagan & Schaeff

[57] ABSTRACT

A load-referenced, pressure reducing valve, and a system which incorporates one or more of such valves provide needed response to rapidly changing hydraulic system load demands which are experienced with automatic control systems. The valve provides rapid response for pressure regulation by providing the load pressure to one side of the valve so that immediate, load referenced valve adjustment occurs instantly upon change of load conditions at a system load, and pressure regulation begins immediately without need for fluid flow.

13 Claims, 9 Drawing Sheets

LOAD REFERENCED PRESSURE REDUCING VALVE

BACKGROUND OF THE INVENTION

The present invention relates to pressure reducing valves and pressure compensated flow controls, and particularly to a load-referenced pressure reducing valve capable of adjusting hydraulic pressures as needed to meet changing load demands for the purpose of flow control at high speeds compatible with automatic control systems.

Operation of construction, agricultural and other equipment is now possible with automatic control systems, such as laser guidance and laser reference systems, which interface with existing hydraulic control systems present on the equipment. Automatic systems are capable of controlling and adjusting equipment functions faster and with greater frequency than is possible with human operators. Adjustments in hydraulically operated elements, such as wheels, arms, blades and the like, may occur, for example, 10 times per second or more. However, it has been found that conventional hydraulic control systems respond and perform less than optimally in providing such rapid control and adjustment, resulting in an over-correction or under-correction.

It has been found that one of the primary components of hydraulic systems responsible for inadequate response are flow control valve systems which control or limit flow of hydraulic fluid to operating cylinders. One known flow control valve system includes a pressure compensated spool. However, this system is problematic in automatic control situations because it functions to regulate fluid flow, but only after fluid flow has been established. Further, in the absence of flow, it typically returns to a fully open position. Thus, when a hydraulic cylinder in a system is corrected, creating a demand for the hydraulic pump to supply more pressure and flow to the cylinder, fluid surges through the open pressure compensated flow control valve system until sufficient flow allows it to begin regulating to the desired flow rate. By this time, however, the demand for oil is often over-satisfied, and the cylinder position is over-corrected. Meanwhile, the automatic control system may have signalled yet another adjustment. A series of over-corrections can result in undesirable waffling of the cylinder and poor results from unwanted equipment operation.

Examples of several other known valves which serve to reduce pressure within a system are shown in FIGS. 1-4, and will be briefly examined to highlight their operation. FIGS. 1A and 1B schematically illustrate a simple direct acting pressure reducing valve 1. This valve 1 is designed to maintain a constant outlet pressure regardless of the inlet pressure at inlet 2. The valve 1 is normally open, forced open by a spring 4 at the first end 6 of the spool 5. Spring 4 determines the valve closing pressure. A passage 8 provides outlet pressure to the second end 7 of the spool 5, and when the pressure level at the outlet 3 exceeds the spring force, the spool 5 will shift toward the closed position. As shown in FIG. 1B, this restricts the flow from inlet 2 to outlet 3. When the inlet pressure is less than or equal to the spring pressure, flow restriction and pressure drop is essentially zero, as shown in FIG. 1A. Increase in the pressure above the spring force causes the valve 1 to begin closing to restrict flow and pressure and create a pressure drop equal to the difference between inlet pressure and the spring force, as in FIG. 1B. For example, if inlet pressure is 1500 pounds per square inch (psi), and the spring pressure is 1000 psi, the spool 5 will shift to a position that restricts flow and creates a pressure drop of 500 psi, and produces an outlet pressure of 1000 psi. Where there is no flow, if the inlet pressure is less than the spring pressure, the valve 1 will stay open. If the inlet pressure is greater than the spring pressure, and there is no flow, there is a pressure drop, and pressure regulation occurs. The outlet pressure will equal the spring pressure, and close the valve 1 In valve 1, any fluid which may leak past the spool 5 and into the spring cavity 9, is drained from drain 10 to a tank (not shown) from which fluid is pumped into the system by the hydraulic pump (not shown). The drain 10 prevents a build-up of fluid and pressure which would eventually prevent the spool 5 from shifting. As may be seen in FIGS. 1A and 1B, the spring force may be changed by an adjusting screw 11.

Figure 1A:
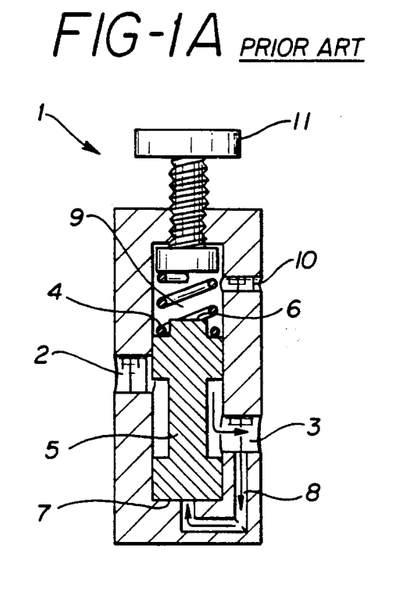
FIG. 1A is a schematic cross-sectional view of a simple direct acting pressure reducing valve known in the prior art in a fully open position.
Figure 1B:
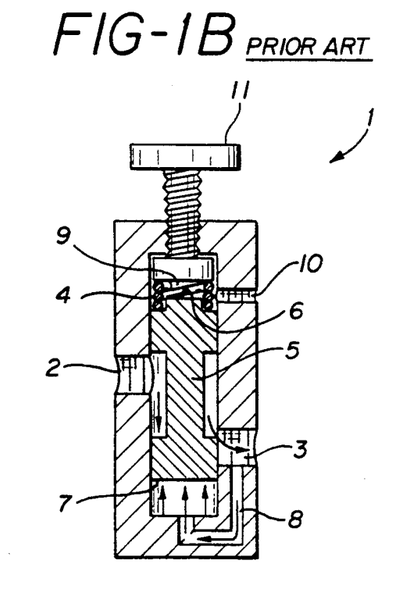
FIG. 1B is a schematic cross-sectional view of the direct acting valve of FIG. 1A in a partially closed position.
Figure 2:
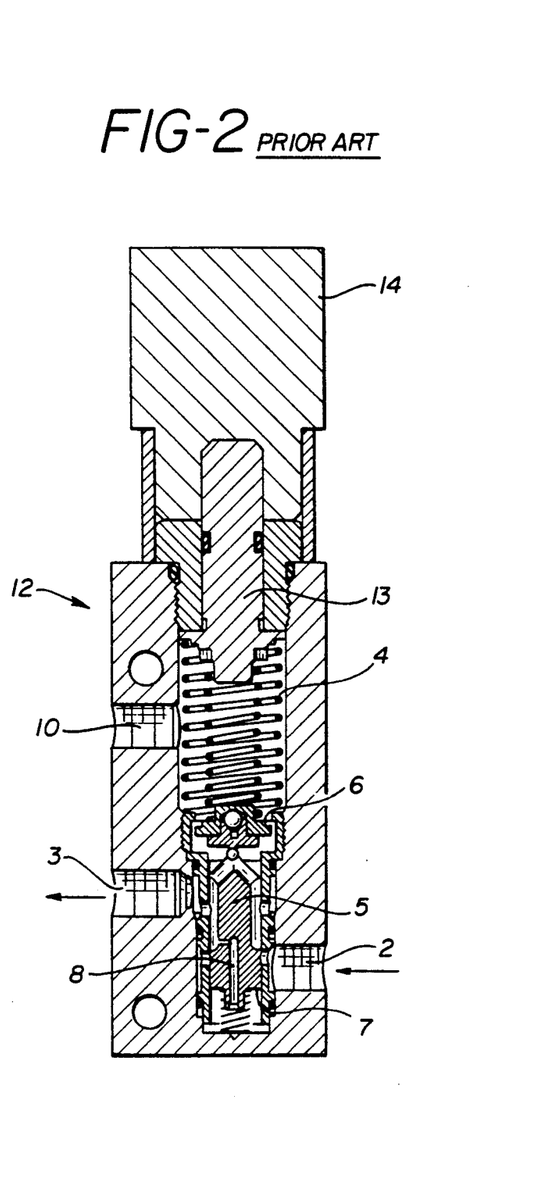
FIG. 2 is a schematic cross-sectional view of a simple pilot-operated valve modified as known in the art to include a plunger in place of an adjusting screw.

In FIG. 2, where like numbers equal like elements, a pilot-operated valve 12, a modified valve of the type shown in FIG. 1, is shown in which a plunger 13 replaces the adjusting screw 11. The plunger 13 is used, like the adjusting screw 11, to vary the force of spring 4. As the spring 4 determines the valve closing pressure, varying its force varies the outlet pressure produced by the valve 12. The plunger arrangement includes an operator 14 to adjust the plunger 13 to produce a variable outlet pressure. Since the outlet pressure is a function of plunger displacement, it has a linear relationship which reflects the spring constant of the spring 4.

Figure 3A:
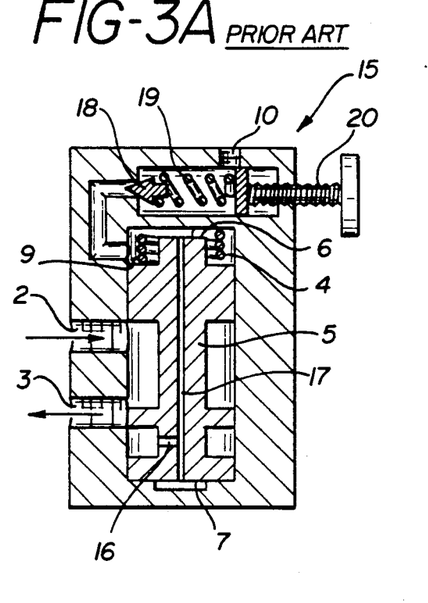
FIG. 3A is a schematic cross-sectional view of a pilot-operated valve known in the prior art, shown in a fully open position, in which a fixed back pressure is applied to the spool end and spring.
Figure 3B:
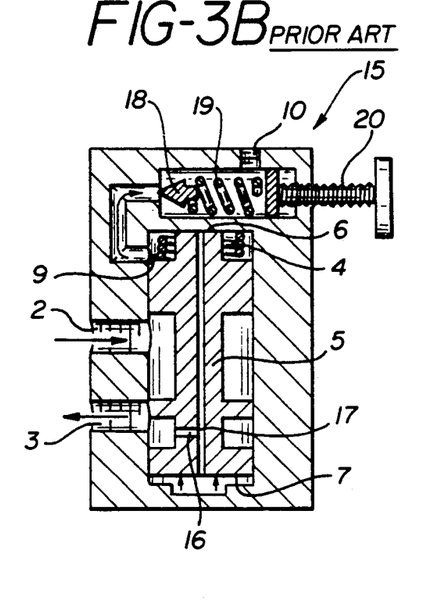
FIG. 3B is a schematic cross-sectional view of a pilot-operated valve, in a partially closed position, in which a fixed back pressure is applied to the spool end and spring.

FIGS. 3A and 3B, where like numbers indicate like elements, show a pilot-operated valve 15. Outlet pressure from the outlet 3 is provided to both the second end 7 and first end 6 of valve spool 5 through a cross drill 16 and control orifice 17. Fluid from outlet 3 entering the cross drill 16 flows downward through the control orifice 17 to provide outlet pressure to the second end 7, and flows upward through the control orifice 17 to the first end 6 of the spool 5 to fill spring chamber 9. Fluid pressure in spring chamber 9 on the first end 6 of the spool 5 will prevent closing of the valve 15 until the pilot dart 18 is unseated against pilot spring 19, allowing fluid to flow past the pilot dart 18 to drain 10. Pilot spring 19 is set at a given pressure by screw 20, as shown in FIG. 3B, and for the valve 15 to begin to adjust, pressure on the second end 7 must be equal to the force of pilot spring 19. Pressure will build up on the second end 7 until the pressure difference between the first and second ends 6, 7, equals the force of spring 4, at which time the spool 5 will move to restrict fluid flow from inlet 2 and outlet 3 to produce the constant pressure drop, as also shown in FIG. 3B. For example, if the force of spring 4 is 50 psi and the force of pilot spring 19 is 950 psi, no regulation will begin occurring until the outlet pressure reaches 950 psi and the pilot dart 18 is unseated. Once pressure at end 6 of spool 5 is sufficient to unseat pilot dart 18, fluid will flow past the pilot dart 18 to drain 10. Pressure will build up on end 7 of spool 5 while remaining constant at end 6 until the difference equals the force of the spring 4. The spool 5 will shift to produce a regulated outlet pressure of 1000 psi. If there is no flow, a pressure differential is established between inlet 2 and outlet 3. If the pressure in a no-flow situation is sufficiently high to unseat the dart 18, the pressure at the first and second ends 6, 7, nonetheless tends to equilibrate, and the spool 5 regulates slightly open to supply the oil passing over the dart 18.

Figure 4:
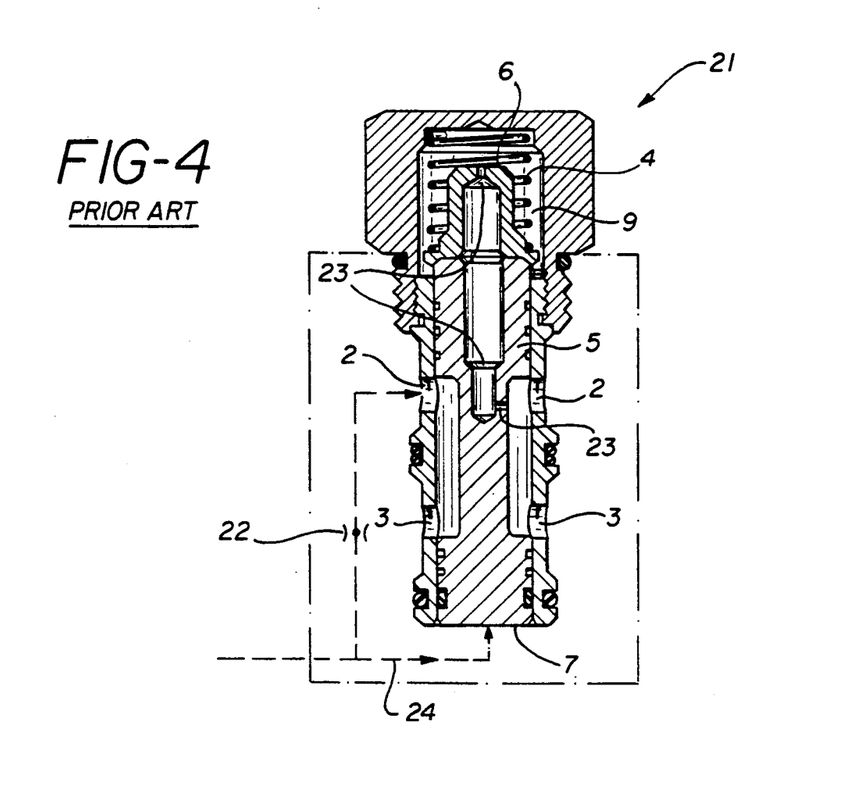
FIG. 4 is a schematic cross-sectional view of a pressure compensating spool valve known in the art in which a constant pressure drop is maintained across an orifice to produce a constant flow rate through the valve.

FIG. 4, where like numbers refer to like elements, shows a pressure compensating spool valve 21 including an orifice 22 upstream from the valve inlet 2 for flow control. In the valve 21, a spring 4 provides spring pressure at the first end 6 of the spool 5 to force the spool 5 to its open position. A sense line 23 downstream from the orifice 22 adds outlet pressure to the first end 6 of spool 5. A pilot line 24, shown schematically, provides inlet pressure upstream of the orifice 22 to the second end 7 of the spool 6. Where there is flow through the orifice 22, a pressure difference exists between the pressures in the sense line 23 and pilot line 24, the latter being greater. A minimum pressure differential must exist across the orifice 22 which is equal to or greater than the spring force, before compensation will occur. When the pressure differential across orifice 22 begins to increase above this minimum, the relative force on the second end 7 also increases, and tends to close the valve 21 against both the force of spring 4 and pressure from the sense line 23. This action reduces the flow through the orifice 22, regulating and returning the pressure differential thereacross to a fixed value. By maintaining a fixed pressure drop across orifice 22, regardless of the actual inlet and outlet pressures, a constant flow through the valve 21 is maintained. If there is little or no flow and the pressure differential is less than the needed minimum, no regulation occurs. Substantially equal pressures are provided to the first and second ends 6, 7 of spool 5, and the valve 21 remains open.

In the prior art pressure compensated flow control valve previously discussed, regulation depends on flow to establish a pressure drop, resulting in a controlled flow. Without flow, the pressure differential upon which regulation depends is not established. The time required to establish sufficient flow, begin regulation, and control flow and pressure to the needed level is too great to accurately satisfy the demands of automatic control systems. Because such valves generally remain open when there is no flow, a hydraulic system subjected to sudden demand from an operating element will tend to over-satisfy that demand before flow initiated therein is brought under control. This problem is accentuated in systems where the hydraulic pump satisfies both high and low pressures simultaneously, and the pump typically operates at the higher pressure. In such systems, when the pump is opened to a low pressure circuit in which the valves are open, an even greater surge of flow and pressure is experienced.

Accordingly, there is a need for improved hydraulic valves which provide pressure regulation independent of flow, for use in hydraulic systems which can satisfy the demands of automatic control systems which require rapid control and adjustment of operating elements.

SUMMARY OF THE INVENTION

This need is satisfied by the present invention which provides a load-referenced pressure reducing valve capable of adjusting hydraulic pressures at high speeds compatible with automatic control systems for the purpose of flow regulation. The valve of the present invention includes a removable cartridge fixed inside in a valve body including inlet, outlet, tank, and load-sensing apertures. The cartridge further includes a spring chamber and spool bore. A spring is disposed inside the spring chamber and engages one end of a spool which is slidably positionable inside the spool bore. The spool is shaped to define first, second, and third portions thereof. Preferably, the inlet and outlet apertures of the cartridge are open to the first portion at one end of the spool bore, while the load-sensing aperture is open to the second portion at the opposite end of the spool bore near the spring chamber. The tank aperture is open to the third portion in the middle of the spool bore. Between the second and third portions of the spool a seal is included to isolate the load referenced pressure applied at the second portion from the pressures in the other portions and to prevent leakage. From the first to the third portion of the spool some leakage does occur and the tank aperture serves to drain this fluid.

The spring provides opening pressure to displace the spool in the cartridge so that the flow path from the inlet aperture to outlet aperture is open. In accordance with the present invention, a pressure sensing line from a system load, such as a hydraulic cylinder, provides load pressure through the load-sensing port to the spring chamber. The load pressure and spring pressure are both applied at the same end of the spool and act to open the valve. In opposition thereto, valve outlet pressure applied to the opposite end of the spool, acts to close the valve. This arrangement allows the valve of the present invention to respond rapidly to changes in load pressure, and to immediately provide fluid and pressure so as to maintain or rapidly change the cylinder position consistent with the needs of automatic control systems. The valve of the present invention tends to close when the system is static while maintaining the correct initial pressure drop across an orifice or orifices.

For example, when the pressure at a system load, such as a cylinder, is suddenly increased, the increased load pressure will be immediately conveyed through the load-sensing line to the spring chamber to open the valve and provide more pressure. It is understood that the supply pressure to the valve is at least as great as the load under consideration, and that the hydraulic pump is capable of stroking up to meet increased pressure requirements. Conversely, if the pressure at the system load drops, the pressure in the load-sensing line will drop, and the valve will tend to shift under the force of the outlet pressure. Fluid or pressure will be relieved from the outlet to the tank through the spool as it slides to equalize the forces on its ends. Problems with overcompensation are avoided as the valve of the present invention, tending to close when the system is static, begins to open from a closed position. Regulation begins immediately without need for flow. If the inlet pressure is excessive, the load-referenced valve starting from a closed position prevents an unwanted surge.

The present invention, thus, relates both to a load-referenced valve, and to a system which incorporates one or more load-referenced valves to provide rapid response to changing system load and flow demands experienced with automatic control systems. In the system of the present invention a source of pressurized fluid will supply fluid through one or more valves of the present invention to a hydraulic cylinder. Hydraulic cylinders typically have a piston defining first and second chambers. Alternately pressurized and relieved, the first and second chambers change in volume, move the piston, and thereby operate an element of a machine. First and second means for supplying fluid, supply fluid to the first and second chambers, respectively, while first and second means for returning fluid receive fluid therefrom.

In the system of the present invention, at least one of the first and second means for supplying fluid to a cylinder includes the load-referenced valve of the present invention. In addition, for best system operation, the means for supplying fluid which includes the load-referenced valve, will also include: a means for preventing backflow to the load-referenced valve, such as a check valve; and means for impeding the flow of fluid to the cylinder, such as a stop valve, and orifice. A load-sensing line from the cylinder transmits the load pressure from the first chamber to the load-sensing port of the valve of the present invention. These elements together operate to provide load-referenced fluid pressure and flow to the first chamber of the cylinder. The first means for returning fluid provides a route to return fluid from the first chamber of the cylinder. The second means for supplying and second means for returning fluid to and from the second chamber, respectively, may be similarly configured, or may be a simpler circuit which provides a fixed pressure as well as supply and return flow through a standard pressure reducing-/relieving valve. A system incorporating a load-referenced valve in accordance with the present invention may clearly be a more complex system than that described above.

For example, in some hydraulic systems, the first means for supplying fluid to the first chamber of the cylinder may include means for impeding flow which include a plurality of stop valves and orifices. The stop valves and orifices may be selected to provide various flow rates to the cylinder, and may be used to limit flow to the cylinder.

In addition, in accordance with the present invention, existing hydraulic systems may be retrofitted with assemblies having load-referenced valves of the present invention, to provide improved system performance consistent with the demands of automatic control systems. As well, the system may supply fluid and pressure to loads other than simple cylinders.

Accordingly, it is an object of the present invention to provide a load-referenced pressure reducing valve capable of statically adjusting hydraulic pressures at high speeds compatible with automatic control systems for the purpose of controlling flow. It is a further object of the present invention to provide a hydraulic system incorporating one or more load-referenced valves to provide rapid response to changing system load and flow demands experienced with automatic control systems.

DETAILED DESCRIPTION OF THE PREFERRED EMBODIMENT

Figure 5:
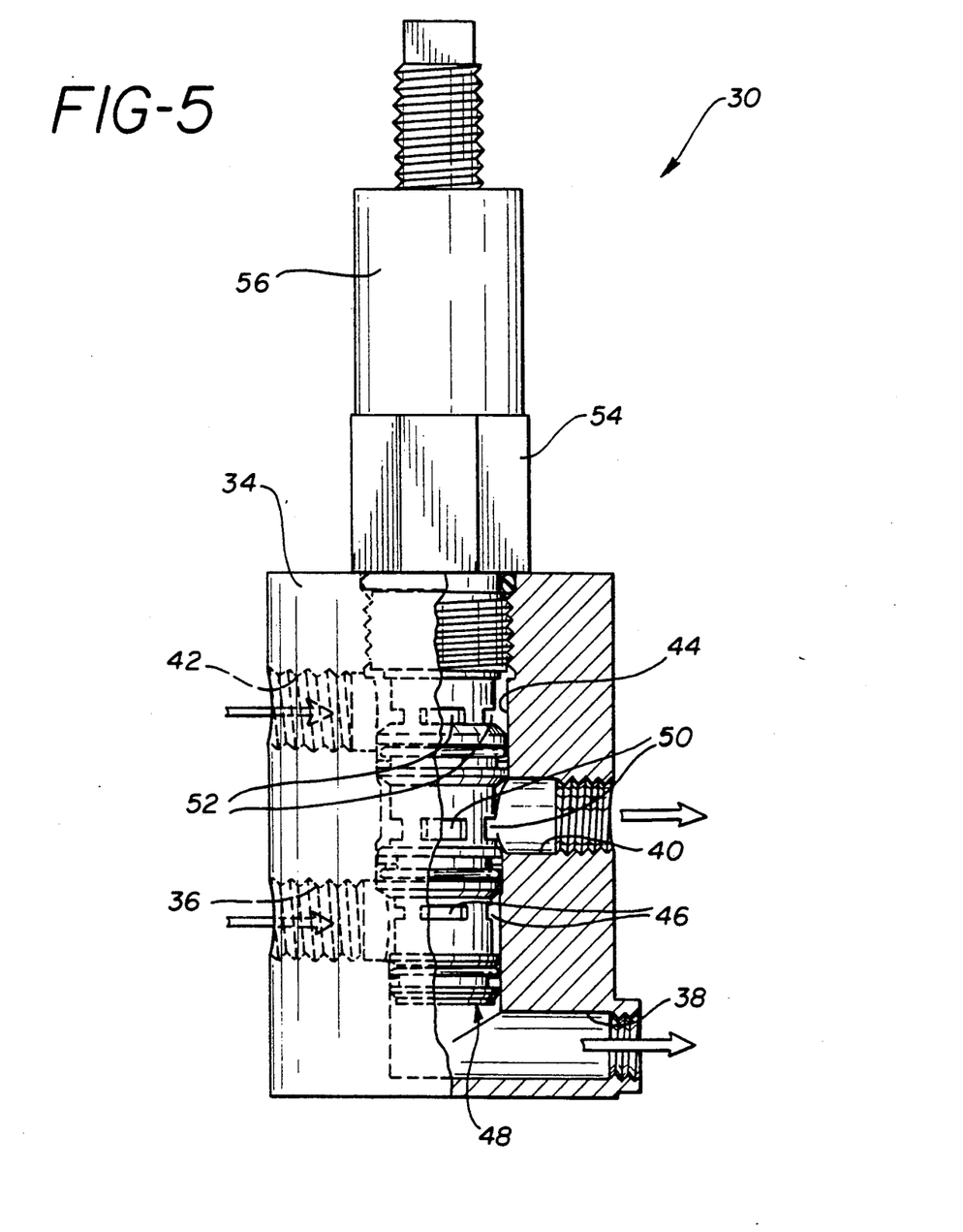
FIG. 5 is a cross-sectional view of the load-referenced pressure reducing valve of the present invention.
Figure 7:
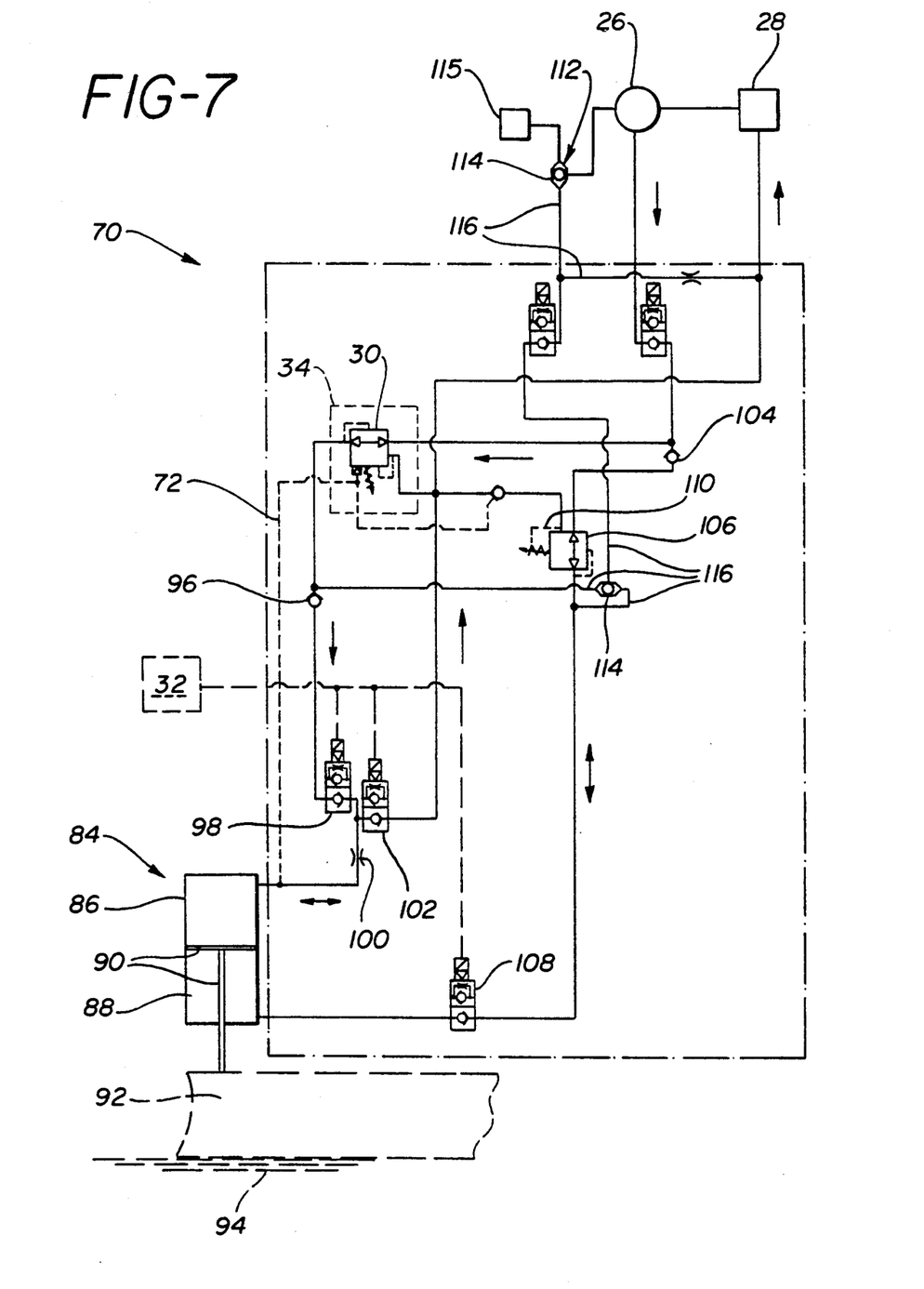
FIG. 7 is a schematic system diagram of a simple system incorporating the load-referenced pressure reducing valve of the present invention.

Referring to FIG. 5, the load-referenced pressure reducing valve 30 of the present invention is shown which is capable of adjusting hydraulic pressures for the purpose of flow control at high speeds compatible with automatic control systems 32, shown representatively in FIG. 7. The valve body 34 of load-referenced valve 30 includes a cartridge bore 44, an inlet port 36, outlet port 38, tank port 40, and a load-sensing port 42, also referred to as a load-referencing port. A removable cartridge 54 is disposed in the cartridge bore 44 of valve body 34. Although removable, cartridge 54 is fixed in position in valve body 34.

The cartridge body 56 includes inlet apertures 46, outlet aperture 48, tank apertures 50, and load-sensing apertures 52, which correspond generally in position with inlet port 36, outlet port 38, tank port 40 and load-sensing port 42, respectively. Outlet aperture 48 at the end of the cartridge has a generally circular shape.

Figure 6A:
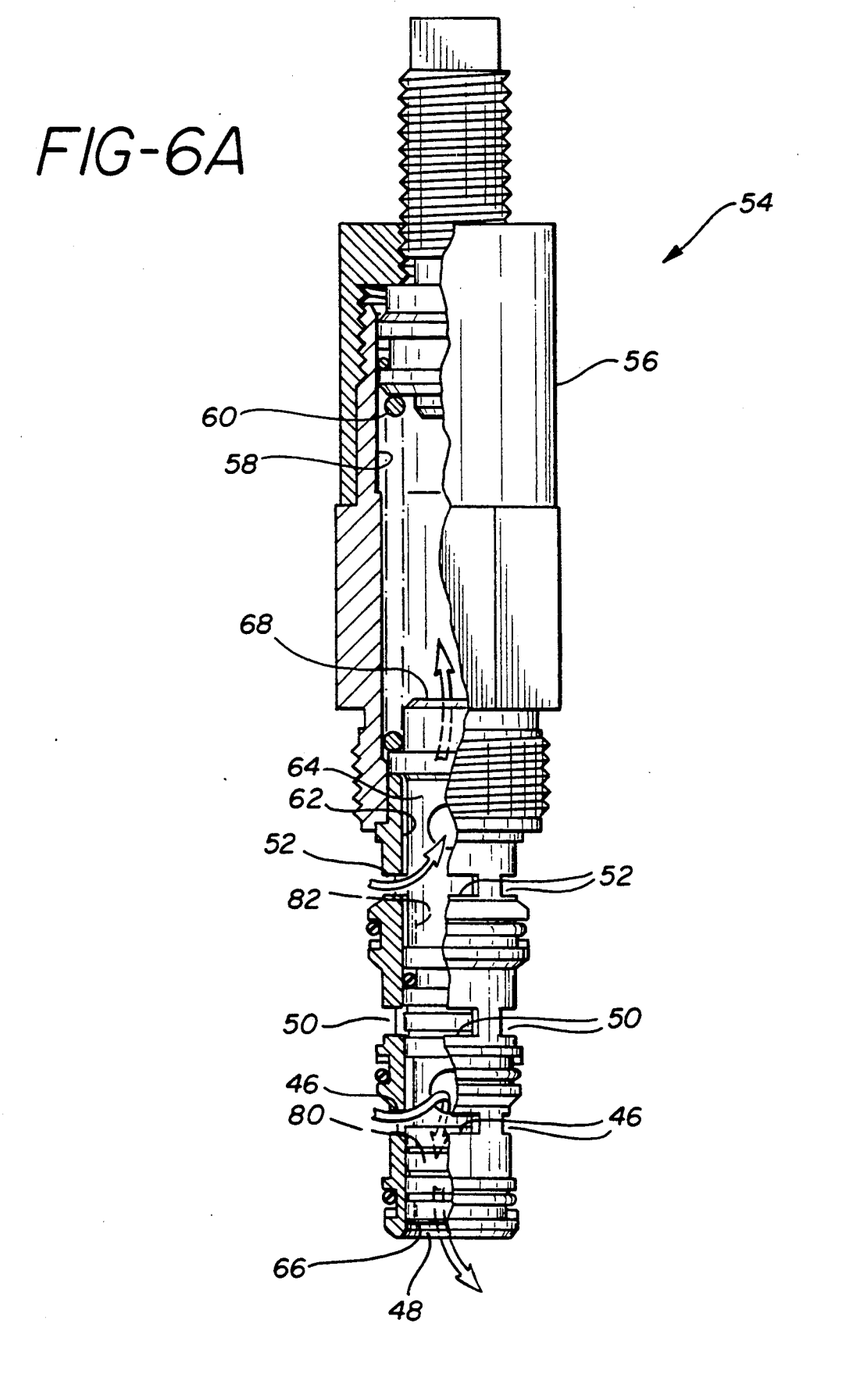
FIG. 6A is a detail side elevational view of the cartridge removed from the valve of FIG. 5, with the cartridge partially cut away in cross-section to show the spool in an open position to allow fluid flow through the valve.
Figure 6B:
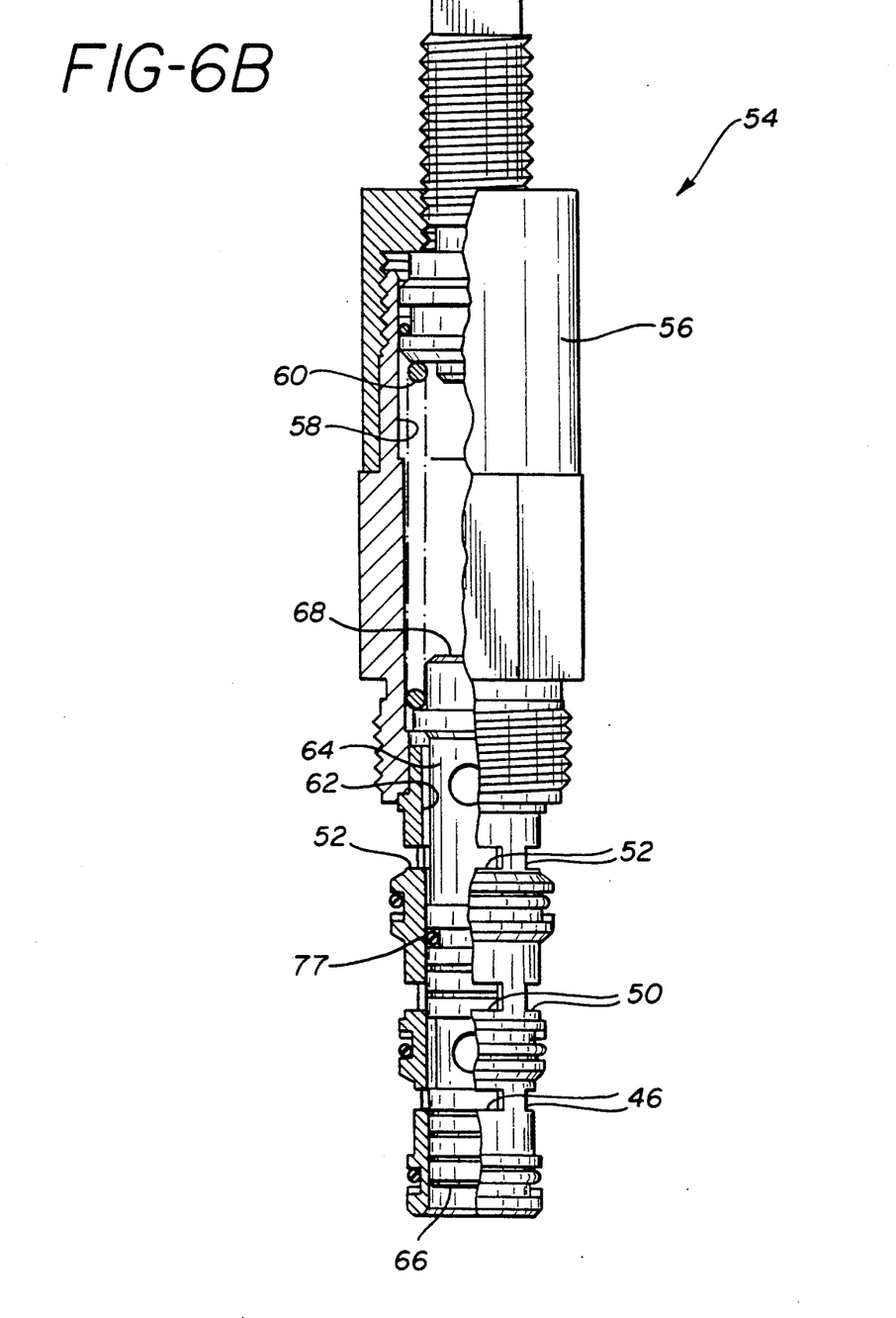
FIG. 6B is a detail side elevational view of the cartridge removed from the valve of FIG. 5, with the cartridge partially cut away in cross-section to show the spool in an closed position blocking flow.

Referring now to FIGS. 6A and 6B, a spring chamber 58 and spool bore 62 are defined inside the cartridge body 56. A spring 60 and a spool 64 are slidably positionable inside the spring chamber 58 and spool bore 62, respectively. Spool 64 engages the spring 60 at one end of spool 64, preferably second end 68. Preferably, the inlet and outlet apertures 46, 48, are near the first end 66 of the spool 64, while the load-sensing apertures 52 are near the opposite, second end 68 of the spool 64 adjacent to the spring chamber 58. The tank apertures 50 are preferably in the middle to drain fluid leaking along the spool from the apertures which see pressurized fluid at the first end 66 of the spool 5. Tank apertures 50 drain to a tank 28 which is typically at or near atmospheric pressure, and which typically supplies a hydraulic pump 26, as representatively shown in FIGS. 7 and 8. In this preferred embodiment, no separate external pilot lines are required to provide pressure reduction and regulation.

Referring to FIGS. 5 and 6A-6C, the spring 60 provides opening pressure to displace the spool 64 so that the flow path from the inlet aperture 46 to outlet aperture 48 is held open. In accordance with the present invention, a pressure sensing line 72 from a system load, such as a hydraulic cylinder 84, both shown in FIG. 7, provides load pressure through the load-sensing port 42 and load-sensing apertures 52, to the spring chamber 58. The load pressure and spring pressure are both applied at the same, second end 68 of the spool 64, and act to slide spool 64 in the cartridge 54 to open the valve 30 and allow flow from inlet apertures 46 to outlet aperture 48. FIG. 6A shows the valve 30 in an open position. In opposition thereto, valve outlet pressure is applied near the opposite, first end 66 of the spool 64, and acts to slide spool in cartridge 54 to close the valve 30, as shown in FIG. 6B. This arrangement allows the load-referenced valve 30 of the present invention to respond rapidly to changes in load pressure, and to immediately provide fluid and pressure to maintain or change the position of cylinder 84 consistent with the needs of automatic control systems.

Figure 6C:
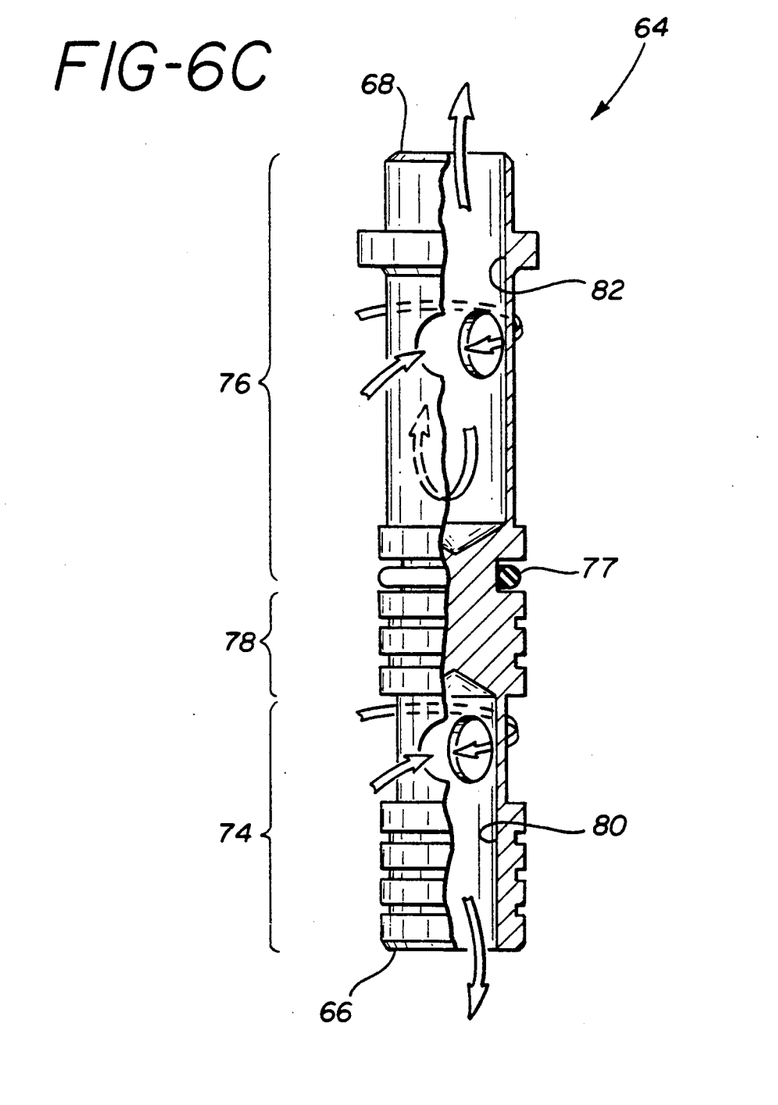
FIG. 6C is a detail side elevational view of the spool removed from the cartridge of FIGS. 6A and 6B, partially cut away in cross-section to show the flow paths therethrough.

Referring to FIGS. 6A-6C, spool 64 includes first, second, and third portions 74, 76 and 78, respectively, which are generally related to the inlet and outlet, load-sensing, and tank apertures 46, 48, 52 and 50, respectively. The first portion 74 of the spool 64 receives and conveys fluid from the inlet apertures 46 to the outlet aperture 48 through an outlet channel 80, as indicated in FIG. 6C. Variation in the position of the spool 64 inside cartridge body 56 causes the first section 74 to vary the flow through inlet apertures 46, and thus, through the valve 30. As shown, spool 64 displaces upward to close inlet apertures 46, and causes flow and pressure restriction to occur primarily at the inlet apertures 46. It is also preferred that the inlet apertures 46 be on the side of cartridge body 56, with the outlet aperture 48 on first end 66. The second portion 76 of the spool 64 receives and conveys load pressure and fluid from the load-sensing apertures 52 into the spring chamber 58. The load-sensing apertures 52 remain open to receive and convey load pressure and fluid, regardless of the position of the spool 64 in the cartridge body 56. Again, the load-sensing apertures 52 are preferably at the second end 68 near the spring chamber 58, with an oil passage channel 82 or like path connecting apertures 52 to the spring chamber 58. The third portion 78 of the spool 64 receives fluid leaking from the first portion 74 which is under pressure during operation of the valve 30. The tank aperture 50 is always open to drain, regardless of the position of the spool 64 in the cartridge body 56. The second portion 76, however, does not receive fluid leaking from the third portion 78 due to O-ring 77, which acts as a seal between the second and third portions 76 and 78.

A hydraulic system 70 is schematically shown in FIG. 7, where the system load, hydraulic cylinder 84, includes a piston 90 which defines first and second chambers 86, 88, therein. Alternately pressurized and relieved through first and second means for supplying fluid, and first and second means for returning fluid, respectively, the first and second chambers 86, 88 change in volume to move the piston 90 in first and second directions, respectively, and operate an element of a machine. As representatively shown in FIG. 7, the machine element is one end of a blade 92 of a motor grader. First and second means for supplying fluid, supply fluid to the first and second chambers 86, 88, respectively, while first and second means for returning fluid receive fluid therefrom.

Still referring to FIG. 7, at least one of the first and second means for supplying fluid includes the load-referenced valve 30 of the present invention. The valve body 34 of the valve 30 is shown formed within a manifold block 71. In the representative system 70 only the first means for supplying fluid includes a load-referenced valve 30 because the blade 92 is only subjected to sudden changes in pressure in the first chamber 86, due to contact with the ground 94 or due to signals from automatic control system 32. No such sudden pressure changes are typically encountered when a machine element, such as blade 92, is raised above the ground 94. However, a second load-referenced valve 30 (not shown) and a second load sensing line 72 (not shown) could be used in the second means for supplying fluid, if desired. Such might be desirable to supply a system load related to a machine element which encounters pressure when moving in both a first, or downward, and a second, or upward, direction. The first means for supplying fluid further includes means for preventing backflow to the load-referenced valve, such as a check valve 96, and means for impeding the flow of fluid to the cylinder, such as a first stop valve 98, orifice 100 or both. Fluid is thus provided to the system load. The load-sensing line 72 transmits the load pressure from first chamber 86 to the load-sensing port 42 and spring chamber 58.

The first means for returning fluid provides a route to return fluid from the first chamber 86 of the cylinder 84 to the tank 28, as shown. The first means for returning fluid has at least one return path. Flow may be interrupted with a second stop valve 102. Where an orifice 100 is used in supplying fluid at an orifice-limited rate to first chamber 86, the second stop valve 102 is preferably positioned so that fluid returning from first chamber 86 will pass first through the orifice 100 before continuing to the tank 28. Such an arrangement allows orifice limited flow to and from the first chamber 86. When a series of orifices 100a-100c of different size are provided, as in FIG. 8, where like numbers represent like elements, fine, medium and coarse adjustments for raising and lowering piston 90 are possible depending on which first stop valve 98a-98c or second stop valve 102a-102c is opened.

The second means for supplying and second means for returning fluid to and from the second chamber, may be configured in the same manner as the first means for supplying and first means for returning fluid, as disclosed above. As shown in FIG. 7, however, they are much simpler circuits, and supply and return fluid at a fixed pressure through a standard pressure reducing valve, such as that shown in FIGS. 3A and 3B.

Second means for supplying fluid receives fluid from a source of pressurized fluid, such as pump 26. The fluid passes through a means for preventing backflow, such as a second check valve 104, and then through pressure reducing/relieving valve 106 which supplies a set pressure. Pressure reducing/relieving valve 106 includes a drain line 110 also for pressure relief which drains to tank 28. Fluid continues to second chamber 88 through third stop valve 108 which opens and closes as necessary to provide supply or return of fluid. Thus, when fluid is supplied to second chamber 88 it passes through check valve 104, pressure reducing/relieving valve 106 which establishes a set pressure, and third stop valve 108. Fluid is returned from second chamber 88 when the stop valve 108 is open and the pressure in second chamber 88 exceeds the set pressure of pressure reducing/ relieving valve 106. Second means for returning fluid includes a portion of second means for supplying fluid. Fluid returning from second chamber 88 returns back through third stop valve 108 to pressure reducing/relieving valve 106. At pressure valve 106, however, the returning fluid, which is over-pressure, relieves through overflow line 110, and returns to tank 28.

In operation, first means for supplying fluid and second means for returning fluid work together to lower piston 90 in a first direction (i.e. downward, as shown in FIG. 7), or maintain its position when loaded. For example, when the pressure at the system load, cylinder 84, suddenly increases, the increased load pressure in first chamber 86 will be immediately conveyed through the load-sensing line 72 to the spring chamber 58 to open the valve 30 and provide more pressure if needed to correct the cylinder position. It is understood that the supply pressure from pump 26 to the valve 30 is at least as great as was the static load, and that the hydraulic pump 26 is capable of quickly stroking up to meet increased pressure requirements. Conversely, if the pressure at the system load, cylinder 84, drops, the load-referenced valve 30 will tend to close under the force of the outlet pressure, allowing fluid or pressure to be relieved in first means for returning fluid. Over-compensation is avoided as the valve 30 of the present invention, which tends to close when the system is static, thus begins, from a more closed position, to open and satisfy demand. Because the opening of the valve is referenced to the load, pressure regulation begins immediately without need for flow. If the inlet pressure to the valve from pump 26 is high, outlet pressure increases rapidly, and the load-referenced valve 30 opens only slightly, preventing an unwanted surge.

In operation, first means for returning fluid and second means for supplying fluid work together as needed to raise piston 90 in a second direction. For example, third stop valve 108 passes the supply fluid at a set pressure to second chamber 88, while second stop valve 102 is opened to allow fluid to drain from first chamber 86.

In accordance with the present invention, system 70 preferably further includes means for sensing 112 system pressures which produces a pressure signal at the source of hydraulic pressure, pump 26. The means for sensing 112 uses one or more shuttle valves 114 in a sensing circuit 116. The shuttle valve(s) 114 compare pressure sensing lines from two points, and shift to expose the highest pressure to the sensing circuit 116. Thus, through the shuttle valve(s) 114, the highest pressure in the system 70 is conveyed to the pump 26, and the pump provides pressure at that maximum. Such operation of the pump ensures that sufficient system pressure exists to meet system demands. A manual valve 115 is shown connected to one of the shuttle valves 114 and allows for manual control of the blade 92 when automatic control is not being employed.

Figure 8:
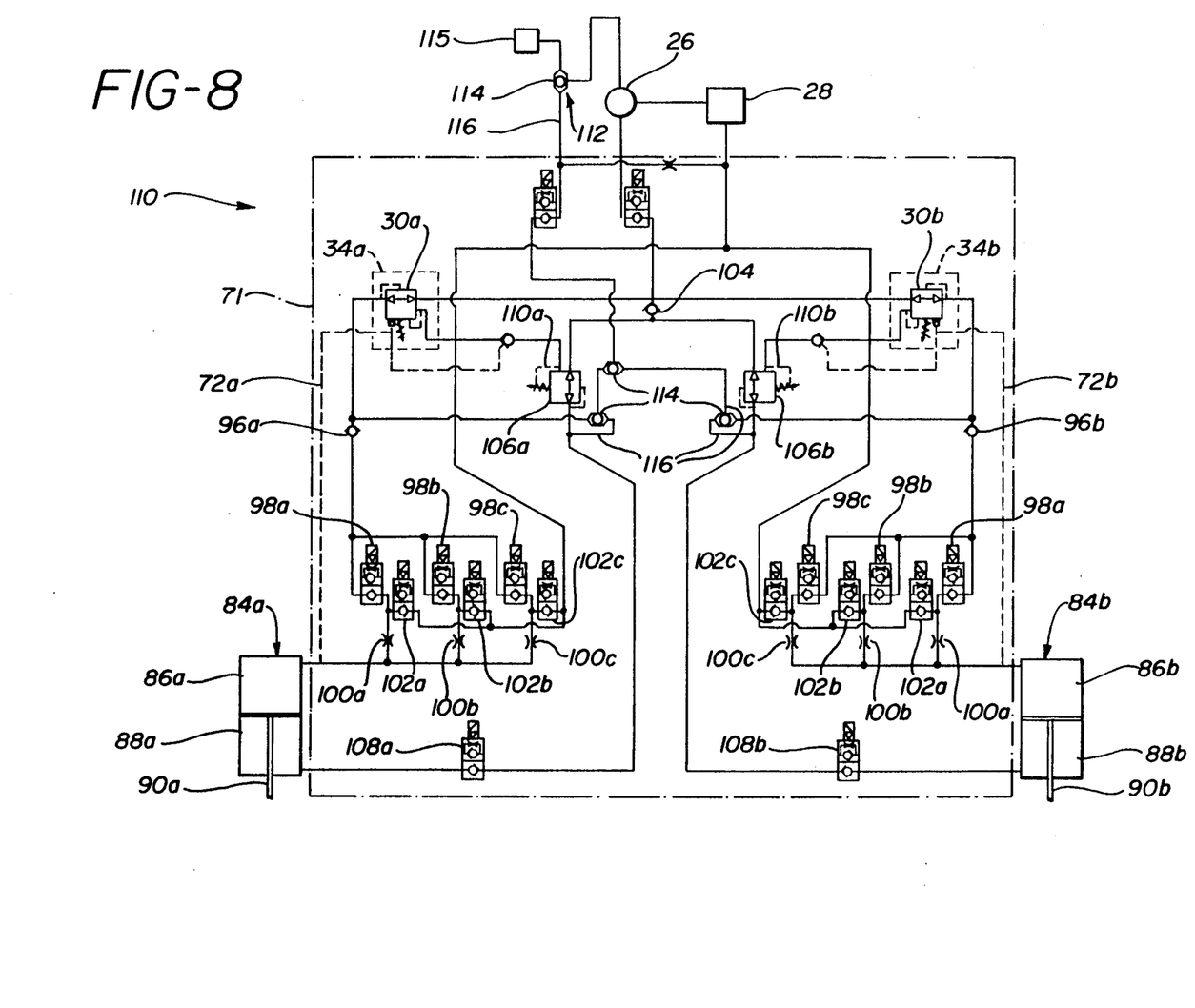
FIG. 8 is a schematic system diagram of a more complex system incorporating the load-referenced pressure reducing valve of the present invention.

Referring now to FIG. 8, a more complex system 110 is shown wherein like numbers indicate like elements. System 110 is illustrative of more complex systems which may incorporate a load-referenced pressure reducing valve 30 in accordance with the present invention. In system 110, two cylinders 84a, 84b are shown which operate in the same fashion as described with respect to system 70. In system 110, however, first means for supplying fluid to first chambers 86 include three first stop valves 98a–98c and three orifices 100a–100c. Each of the orifices 100a–100c has a different size, allowing different amounts of fluid to flow therethrough. By opening one or more of the first stop valves 98a–98c associated with a particular cylinder, various flow rates may be provided to the first chamber(s) 86a, 86b, as needed to correct the position of the piston(s) 90a, 90b. Cylinders 84a and 84b may be connected to separate operating elements or to opposite ends of the same operating element, such as blade 92.

Figure 9:
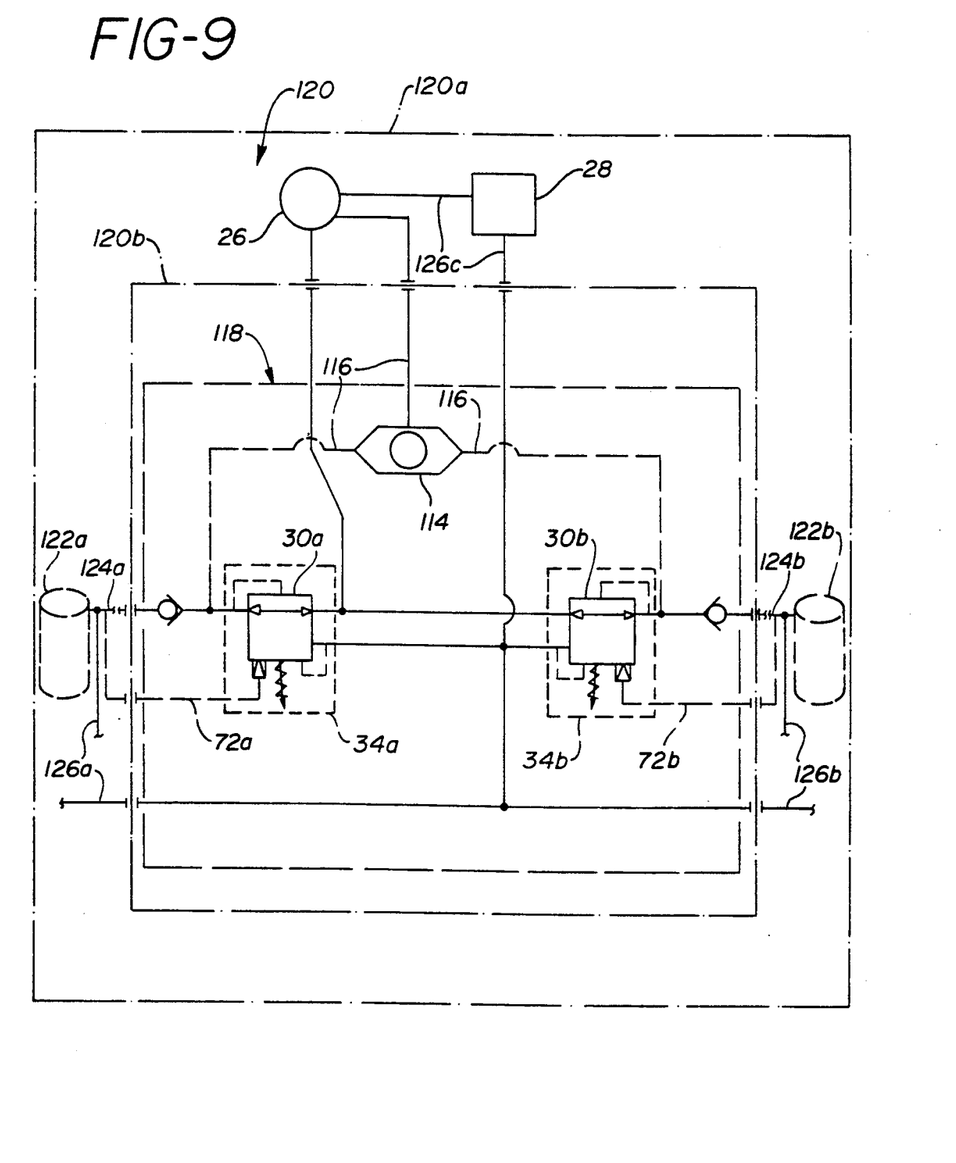
FIG. 9 is a schematic diagram of a retrofit assembly having two load-referenced pressure reducing valves in accordance with the present invention for retrofit of existing hydraulic systems having two cylinders.

FIG. 9 illustrates the use of one or more load-referenced valves 30 of the present invention in a retrofit assembly 118 for existing hydraulic systems 120, shown within dashed lines 120a and 120b, which are used to control machine elements. The use of one or more load-referenced valves 30 permits an existing system 120 to correctly respond quickly to the demands of automatic control systems. Like numbers represent like elements and, as shown, two load-referenced valves 30a, 30b control the pressure and flow of fluid supplied from pump 26 to two system loads, 122a and 122b. The respective valve bodies 34a and 34b of the two valves 30a and 30b are shown formed within the retrofit assembly 118. Load-referenced valves 30a and 30b supply hydraulic fluid through existing supply lines 124a, 124b to the first and second loads 122a, 122b, respectively. Fluid returns therefrom through existing return lines 126a, 126b to a return circuit 126c. Load sensing lines 72a, 72b provide pressure from the loads 122a, 122b to the load sensing ports 42a and 42b of the 10 valves 30a, 30b, respectively. As is preferred, a pressure sensing circuit 116 includes a single shuttle valve 114 which will indicate the highest system pressure to the pump 26. FIG. 9 is illustrative of the use of the valve 30 of the present invention in an existing system to improve system performance, and the present invention is not limited to the specific example shown.

Operation of the load-referenced valve 30 and systems 70, 110 and 120 of the present invention is contemplated with automatic control systems 32, representatively shown in FIGS. 7 and 8. Such automatic control systems 32 include, for example, commercially available automatic laser control systems. One such system is the Laserplane Motorgrader Control System, available from Spectra-Physics, Dayton, OH. In the Laserplane System a reference plane of laser light established by a transmitter is received by a receiving system located on a motorgrader. The receiving system automatically operates the hydraulic system of the motorgrader and thereby controls the elevation of the motorgrader blade. Corrections in the position of the motorgrader blade occur at 10 times per second, requiring rapid response by the hydraulic systems, made possible by the load-referenced valve 30 and systems 70, as illustrated by the representative use of such valves 30 in systems 110 and 120. Automatic control systems exist for a wide range of other equipment, such as bulldozers and paving machines. However, the present invention may be applied to any hydraulic systems which require a rapid response such as that demanded by automatic control systems representatively discussed herein.

The present invention, thus, relates both to a load-referenced valve 30, and to a system, representatively illustrated by systems 70, 110, 120, which incorporate one or more load-referenced valves 30 to provide rapid response to changing system load demands experienced with automatic control systems. Not only will the valve 30 provide rapid response for pressure and flow regulation, the system of the present invention will supply fluid from a source of pressurized fluid to a system load without overcorrection, and without need for fluid flow to establish the limited, reduced pressure.

While certain representative embodiments and details have been shown for purposes of illustrating the invention, it will be apparent to those skilled in the art that various changes in the apparatus, method and article disclosed herein may be made without departing from the scope of the invention, which is defined in the appended claims.

What is claimed is:

1. A variable pressure reducing valve which provides load-referenced pressure reduction independently of flow therethrough, said valve comprising:
   a valve body having a cartridge bore and a plurality of ports, said plurality of ports including at least an inlet port, an outlet port, a tank port, and a load sensing port;
   a cartridge, at least a portion of which is disposed in said cartridge bore, comprising:
      a cartridge body defining:
         a plurality of apertures, ones of said plurality of apertures generally aligned with ones of said ports, said apertures including at least one inlet aperture, at least one outlet aperture, at least one tank aperture and at least one load sensing aperture;
         a spring chamber: and
         a spool bore;
      a spring disposed in said spring chamber; and
      a spool slidably disposed in said spool bore and engaging said spring, said spool further including:
         a first portion adapted to receive and convey fluid from said inlet aperture to said outlet aperture, said first portion slidably positionable to vary the flow of said fluid between said inlet and outlet apertures;
         a second portion adapted to receive and convey fluid and pressure from said load sensing aperture to said spring chamber; and
         a third portion adapted to receive fluid leaking from said first portion inside said cartridge body and convey said fluid to said tank aperture.

2. The pressure reducing valve of claim 1 wherein said inlet aperture, tank aperture and load sensing apertures are on the side of said cartridge body, and said outlet aperture is positioned on one end of said cartridge body.

3. The pressure reducing valve of claim 1 wherein:
   said inlet aperture and said outlet aperture are disposed generally at a first end of said cartridge body, and said first portion of said spool includes an outlet channel to convey fluid from said inlet aperture to said outlet aperture;
   said spring chamber is disposed generally at a second end of said cartridge body, and said second portion of said spool includes means for conveying fluid from said load sensing aperture to said spring chamber; and
   said third portion of said spool is disposed between said first and second portions of said spool.

4. The pressure reducing valve of claim 1 wherein said cartridge further includes means for adjusting the length of said spring to adjust the pressure exerted by said spring on said spool.

5. The pressure reducing valve of claim 1 wherein:
   said valve further comprises a plurality of cartridge seals disposed between said cartridge body and said valve body, ones of said cartridge seals positioned between said inlet aperture and said outlet aperture, between said tank aperture and said inlet aperture, and between said tank aperture and said load-sensing aperture; and
   said cartridge further comprises a spool seal disposed between said cartridge body and said spool, and positioned between said load sensing aperture and said tank aperture.

6. A system for supplying hydraulic fluid to a system load to meet rapidly changing load demands thereat, said system comprising:
   a source of pressurized hydraulic fluid;
   at least one hydraulic cylinder having a piston slidably disposed therein defining first and second chambers in said cylinder, said piston operable in first and second directions by fluid pressure in said first and second chambers, respectively, said cylinder subjected to variable loading in at least said first direction of operation;
   first and second means for supplying hydraulic fluid to said first and second chambers, respectively, at least said first means for supplying including:
      a load-referenced pressure reducing valve which provides load-referenced pressure reduction independently of flow therethrough, said valve comprising:
         a valve body having a cartridge bore and a plurality of ports, said plurality of ports including at least an inlet port, an outlet port, a tank port, and a load sensing port;
         a cartridge, at least a portion of which is disposed in said cartridge bore, comprising:
            a cartridge body defining:
               a plurality of apertures, ones of said plurality of apertures generally alignable with ones of said ports, said apertures including at least one inlet aperture, at least one outlet aperture, at least one tank aperture and at least one load sensing aperture;
               a spring chamber: and
               a spool bore;
            a spring disposed in said spring chamber; and
            a spool slidably disposed in said spool bore and engaging said spring, said spool further including:
               a first portion adapted to receive and convey fluid from said inlet aperture to said outlet aperture, said first portion slidably positionable to vary the flow of said fluid between said inlet and outlet apertures;
               a second portion adapted to receive and convey fluid from said load sensing aperture to said spring chamber; and
               a third portion adapted to receive fluid leaking from said first portion inside said cartridge body and convey said fluid to said tank aperture;
      means for preventing backflow to said load-referenced pressure reducing valve, said means for preventing backflow disposed downstream from said outlet port of said load-referenced pressure reducing valve;

at least one first means for impeding the flow of said fluid to said cylinder, said first means for impeding flow disposed downstream from said means for preventing backflow; and at least one load sensing line communicating fluid pressure from said first chamber of said cylinder to said load sensing port of said load-referenced pressure reducing valve; and first and second means for returning fluid from said first and second chambers, respectively;

whereby said at least one load-referenced pressure reducing valve rapidly adjusts in position in response to fluid pressure variations in said first chamber.

7. The system of claim 6 wherein:

said at least one first means for impeding the flow of said fluid to said cylinder comprises at least one first direction valve to supply fluid to said first chamber to provide pressure and flow to operate said piston in said first direction of operation; and at least said first means for returning comprises at least one second direction valve to return fluid from said first chamber to allow said piston to operate in said second direction.

8. The system of claim 7 wherein:

said first means for supplying fluid to said first chamber includes at least two parallel supply paths; and said at least one first means for impeding flow includes, in each of said at least two parallel paths:

at least one first direction valve; and at least one orifice downstream therefrom;

wherein each of said orifices have different sizes;

whereby at least one of said first direction valves may be opened to provide different flow rates to said first chamber.

9. The system of claim 8 wherein said first means for returning fluid from said first chamber includes:

at least two parallel return paths, ones of said parallel return paths intersecting ones of said parallel supply paths between said first direction valves and orifices;

each of said return paths including at least one second direction valve;

whereby at least one of said second direction valves may be opened to provide different flow rates away from said first chamber.

10. The system of claim 6 wherein said second means for supplying hydraulic fluid to said second chamber and said second means for returning hydraulic fluid to said second chamber are a single circuit comprising:

a pressure reducing valve producing a constant pressure; and second means for impeding the flow of said fluid from said second chamber.

11. The system of claim 10 wherein said second means for impeding the flow comprises a shut-off valve.

12. The system of claim 6 wherein said system further comprises an automatic control system which is adapted to generate a plurality of adjustment signals; and wherein:

in said first means for supplying flow, said at least one first means for impeding flow is adapted to receive and adjustment signals and provide flow of fluid to said first chamber; and said first means for returning flow is adapted to receive said adjustment signals and permit return flow of fluid from said first chamber;

whereby fluid flow to and from said first chamber if said cylinder is automatically controlled by said automatic control system to move said cylinder in said first or second direction.

13. A pressure regulating system for regulating fluid pressure in an existing hydraulic system having an existing source of pressurized hydraulic fluid, at least one existing system load, at least one means for supplying fluid to said at least one existing system load, and at least one means for returning fluid from said at least one existing system load, wherein at least one said existing system load is subjected to rapidly changing load demands, said pressure regulating system comprising:

at least one load-reference pressure reducing valve for pressure reduction independent of flow therethrough, each said load-referenced valve comprising:

a valve body having a cartridge bore and a plurality of ports, said plurality of ports including at least an inlet port to receive hydraulic fluid from said existing source of pressurized fluid, an outlet port to convey fluid at a reduced pressure to said at least one existing system load subjected to rapidly changing load demands, a load sensing port to receive and convey fluid and load pressure from said existing system load, and a tank port to convey away fluid leaking from said inlet port;

a cartridge, at least a portion of which is disposed in said cartridge bore, comprising:

a cartridge body defining:

a plurality of apertures, ones of said plurality of apertures generally aligned with ones of said ports, said apertures including at least one inlet aperture, at least one outlet aperture, at least one tank aperture and at least one load sensing aperture;

a spring chamber: and a spool bore;

a spring disposed in said spring chamber; and a spool slidably disposed in said spool bore and engaging said spring, said spool further including:

first means to receive and convey fluid from said inlet aperture to said outlet aperture, said means to receive and convey slidably positionable to vary the flow of said fluid between said inlet and outlet apertures;

second means to receive and convey fluid and pressure from said load sensing aperture to said spring chamber; and third means to receive and convey fluid leaking from said first portion inside said cartridge body to said tank aperture;

whereby said existing hydraulic system provides rapid adjustments in pressure in response to rapidly changing load demands in said at least one existing system load.

* * * * *